(12) United States Patent
Shulman et al.

(10) Patent No.: US 11,962,606 B2
(45) Date of Patent: Apr. 16, 2024

(54) PROTECTING SERVERLESS APPLICATIONS

(71) Applicant: Twistlock Ltd., Herzliva (IL)

(72) Inventors: Avraham Shulman, Tel Aviv (IL); Ory Segal, Tel Aviv (IL); Shaked Yosef Zin, Tel Aviv (IL)

(73) Assignee: Twistlock Ltd., Herzliya (IL)

( * ) Notice: Subject to any disclaimer, the term of this patent is extended or adjusted under 35 U.S.C. 154(b) by 399 days.

(21) Appl. No.: 16/161,110

(22) Filed: Oct. 16, 2018

(65) Prior Publication Data

US 2019/0312899 A1 Oct. 10, 2019

Related U.S. Application Data

(60) Provisional application No. 62/652,320, filed on Apr. 4, 2018.

(51) Int. Cl.
*H04L 29/06* (2006.01)
*H04L 9/40* (2022.01)

(52) U.S. Cl.
CPC ........ *H04L 63/1425* (2013.01); *H04L 63/029* (2013.01); *H04L 63/1416* (2013.01)

(58) Field of Classification Search
CPC ................ H04L 63/1425; H04L 63/1416; H04L 63/029
See application file for complete search history.

(56) References Cited

U.S. PATENT DOCUMENTS

| | | | |
|---|---|---|---|
| 2007/0266433 A1* | 11/2007 | Moore | G06F 21/53 726/15 |
| 2013/0318098 A1* | 11/2013 | Chan | G06Q 10/107 707/748 |
| 2015/0067866 A1* | 3/2015 | Ibatullin | H04L 63/1466 726/25 |
| 2016/0212159 A1* | 7/2016 | Gupta | G06F 21/566 |
| 2018/0288091 A1* | 10/2018 | Doron | H04L 63/0227 |
| 2019/0149480 A1* | 5/2019 | Singhvi | H04L 47/78 709/226 |
| 2019/0166221 A1* | 5/2019 | Shimamura | G06F 9/5072 |

* cited by examiner

*Primary Examiner* — Wasika Nipa
(74) *Attorney, Agent, or Firm* — Gilliam IP PLLC

(57) ABSTRACT

A system and methods for protecting a serverless application, the system including: (a) a serverless application firewall configured to inspect input of the serverless function so as to ascertain whether the input contains malicious, suspicious or abnormal data; and (b) a behavioral protection engine configured to monitor behaviors and actions of the serverless functions during execution thereof.

22 Claims, 7 Drawing Sheets

PROTECTING SERVERLESS APPLICATIONS

This patent application claims priority from, and the benefit of, U.S. Provisional Patent Application No. 62/652,320, filed Apr. 4, 2018, which is incorporated in its entirety as if fully set forth herein.

FIELD OF THE INVENTION

This disclosure relates generally to cyber-security systems and, more specifically, to techniques for securing serverless functions against application layer attacks. The present invention generally relates to a serverless (function as a service) application firewall system and service and a behavioral protection engine, including in particular such systems and services implemented in serverless computing or other event-driven function execution environments.

BACKGROUND OF THE INVENTION

Organizations have increasingly adapted their applications to be run from multiple cloud computing platforms. Some leading public cloud service providers include Amazon®, Microsoft®, Google®, and the like. To ensure their services are not interrupted, these service providers must protect their customers against cyber security threats.

In cloud computing platforms, serverless computing is a new emerging technology that provides a cloud computing execution model in which the cloud provider dynamically manages the allocation of machine resources. Such platforms, also referred to as function as a service (FaaS) platforms, allow executing application logic but do not store data. Commercially available platforms include AWS Lambda by Amazon®, Azure® Functions by Microsoft®, Google Cloud Functions Cloud Platform by Google®, Cloud Functions by IBM®, and the like. Private-cloud based offerings include Open FaaS, Fission, Nuclio, Apache Openwhisk, Oracle® Fn etc.

Some serverless vendors also offer what is referred to as serverless computing "on the edge", where the serverless code is executed on internet edge-infrastructure (such as CDN edge nodes), or on connected (IoT) devices.

The common programming model for serverless applications, is referred to as event-driven computing, where the serverless functions are executed as a result of an event trigger. Events may include: HTTP requests, API calls, Email notifications, file storage events, message queue events, SMS notification event, database events, etc.—upon receiving such an event, the serverless environment executes the function, which receives the event's data, as it's input arguments.

Serverless computing is a misnomer, as servers are still employed. The name "serverless computing" is used to indicate that the server management and capacity planning decisions are completely hidden from the developer or operator. Serverless code can be used in conjunction with code deployed in traditional styles, such as microservices. Alternatively, applications can be written to be purely serverless and use no provisioned services at all.

Further, Function as a Service (FaaS) platforms do not require coding to a specific framework or library. FaaS functions are regular applications when it comes to programming language and environment. Typically, functions in FaaS platforms are triggered by event types defined by the cloud provider. Functions can also be triggered by the manually configured events or when one function calls another function. For example, in Amazon® AWS®, such triggers include file (S3) updates, time (e.g., scheduled tasks), and messages added to a message bus. A programmer of the function would typically have to provide parameters specific to the event source it is tied to.

A serverless function is typically programmed and deployed using command line interface (CLI) tools, an example of which is a serverless framework. In most cases, the deployment is automatic and the function's code is merely uploaded to the FaaS platform. A serverless function can be written in different programming languages, such as JavaScript, Python, Java, and the like. A function typically includes a handler (e.g., handler.js) and third-party libraries accessed by the code of the function. A serverless function also requires a framework file as part of its configuration. Such a file (e.g., serverless.yml) defines, at least, events that trigger the function and resources to be utilized, deployed or accessed by the function (e.g., database).

With their computing advantages, serverless functions are also vulnerable to some cyber threats. Such vulnerabilities are not due to infrastructure, but rather to the exploiting of function's code itself. For example, application level vulnerabilities (e.g., cross-site scripting, SQL Injection, Remote Code Execution), may continue to be severe if exploited due to improper programming of the function.

As yet another example, serverless functions also include application dependencies, such as Node.js, PyPI (Python), Maven (Java) or other relevant platforms. Attackers have already exploited vulnerable application dependencies and will likely continue to do so, including within FaaS platforms.

As yet another example, data at rest, which is accessible through serverless functions, can also be exploited by attackers. If an attacker gains access to the data through, for instance, leaked credentials, a compromised insider, or by any other means, serverless functions are not programmed to stop or detect such an attempt.

Since the FaaS and serverless functions have been recently introduced, not many attacks have been detected targeting their vulnerabilities. However, it is expected that the popularity of FaaS will move attackers' focus from targeting servers and infrastructure to targeting services and functions. Since current cyber-security solutions are designed to protect servers and infrastructure, they are ill equipped to efficiently handle vulnerabilities in serverless functions.

It would therefore be advantageous to provide a solution for detecting and securing serverless functions from attacks that would overcome the challenges noted above.

SUMMARY OF THE INVENTION

According to the present invention there is provided a method for protecting serverless functions, the method including: (a) inspecting input of the serverless function so as to ascertain whether the input contains malicious, suspicious or abnormal data.

According to further features in preferred embodiments of the invention described below the method further includes: (b) taking an action when the input contains the malicious, suspicious or abnormal data.

According to still further features in the described preferred embodiments the action includes one or more actions selected from the group including: (i) raising an alert, (ii) halting the serverless function execution, (iii) preventing the serverless function from executing, (iv) removing the malicious, suspicious or abnormal data from the input, (v) raising an exception in code of the serverless function, (vi) generating a log entry of detection of the malicious, suspicious or abnormal data, (vii) generating forensic information related to execution of the serverless function.

According to further features the input is inspected by a serverless application firewall.

According to further features the serverless application firewall operates in a same runtime environment as the serverless function.

According to further features the serverless application firewall inspects the input regardless of a type of communication protocol via which the input is received.

According to further features the inspecting includes classifying an event message, in the input, by detecting an event type. According to further features the inspecting further includes parsing the event message, the parsing based on the detected event type.

According to further features the method further includes decoding encoded fields after the parsing of the event message. According to further features the inspecting includes clearance of fields in the event data which do not affect execution of the serverless function.

According to further features the method further includes: (b) building a profile of normal input by collecting sample data from the input and statistically analyzing the sample data to extrapolate the normal input.

According to further features the profile includes an expected format of an event message in the input, expected content of the event message, and an expected size or length of the event message.

According to further features the method further includes (c) allowing new input conforming to the profile of normal input and taking an action when the new input does not conform to the profile.

According to further features the method further includes: (b) defining a set of wanted and unwanted input data; and (c) allowing the function to execute when detecting wanted input data and taking action when unwanted or unknown input data is detected.

According to further features the method further includes: (c) inspecting function output data. According to further features the method further includes: (d) defining a set of wanted and unwanted output data; (e) taking action when unwanted or unknown output data is detected.

According to further features the method further includes: (d) building a profile of normal output data by collecting sample data from the output data and statistically analyzing the sample data to extrapolate the normal output data; and (e) taking an action when the output data does not conform to the profile of normal output data.

According to another embodiment there is provided a for protecting serverless functions, the method including: (a) monitoring behaviors and actions of the serverless functions during execution thereof.

According to further features the method further includes: (b) providing a set of wanted behaviors and actions; (c) categorizing the monitored behaviors and actions as belonging or not belonging to the set of wanted behaviors; (d) taking an action when the monitored behaviors and actions are not included in the set of wanted behaviors and actions.

According to further features the method further includes: (b) providing a set of unwanted behaviors and actions; (c) categorizing the monitored behaviors and actions as belonging or not belonging to the set of predefined unwanted behaviors; (d) taking an action when the monitored behaviors and actions are included in the set of unwanted behaviors and actions.

According to further features the method further includes: (b) providing sets of wanted and unwanted behaviors and actions; (c) categorizing the monitored behaviors and actions as belonging or not belonging to the set of wanted behaviors and actions or belonging to the set of unwanted behaviors and actions; (d) taking an action when the monitored behaviors and actions are included in the set of unwanted behaviors and actions or are not included in the set of wanted behaviors.

According to further features the method further includes: (b) building a profile of normal behaviors and actions by collecting sample data from the behaviors and actions and statistically analyzing the sample data to extrapolate the normal behaviors and actions; and (c) allowing only new behaviors and actions conforming to the profile of normal behaviors and actions and taking an action when the new behaviors and actions do not conform to the profile.

According to further features the action includes one or more actions selected from the group including: (i) raising an alert, (ii) halting the serverless function execution, (iii) preventing the serverless function from executing, (iv) removing the malicious, suspicious or abnormal data from the input, (v) raising an exception in code of the serverless function, (vi) generating a log entry of detection of the malicious, suspicious or abnormal data, (vii) generating forensic information related to execution of the serverless function.

According to the present invention there is provided a system for protecting a serverless application, the system including: (a) a serverless application firewall configured to inspect input of the serverless function so as to ascertain whether the input contains malicious, suspicious or abnormal data; and (b) a behavioral protection engine configured to monitor behaviors and actions of the serverless functions during execution thereof.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figure 1:
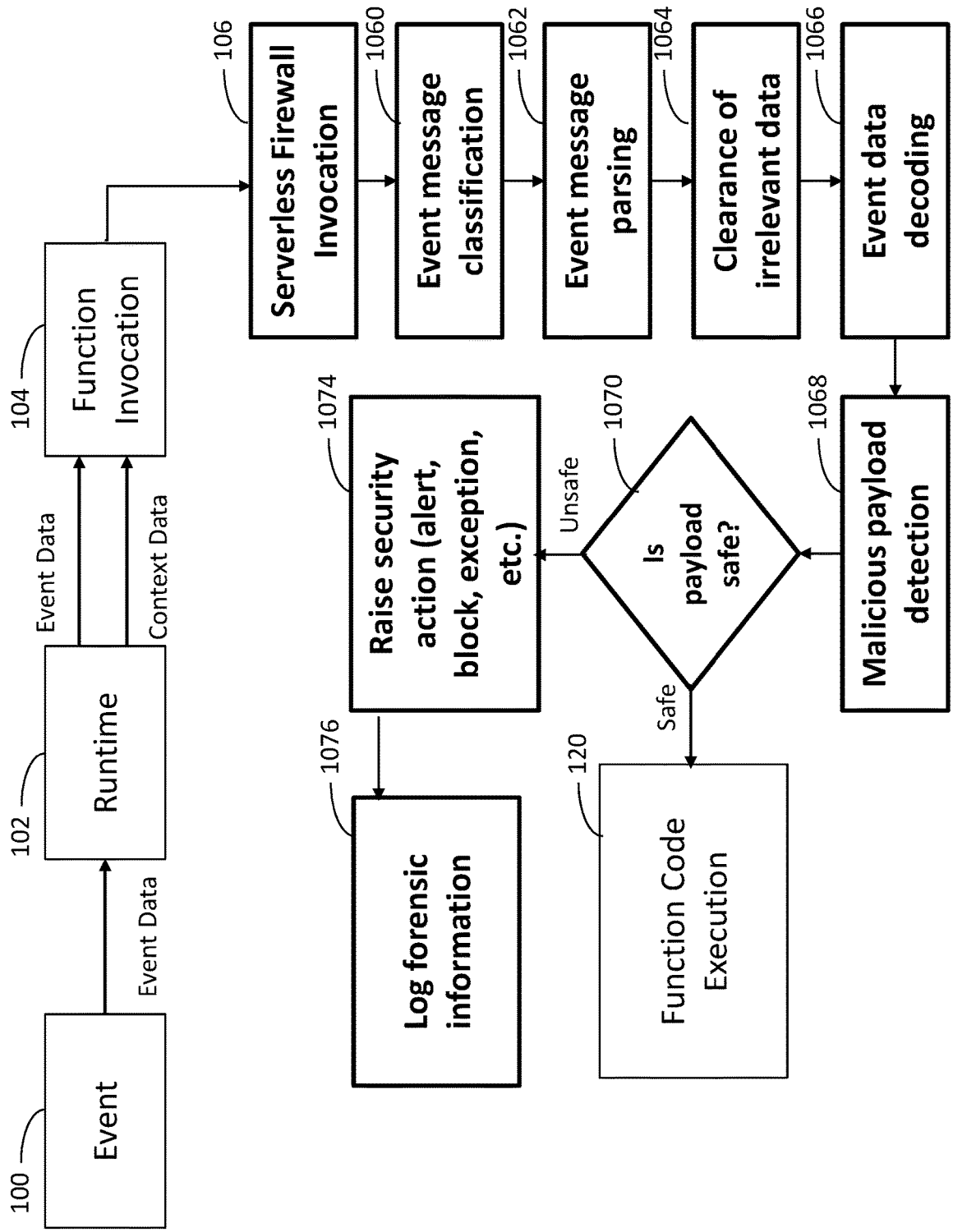
FIG. 1 is a flow diagram of the serverless application Firewall process.

The technical problem that is specific to protecting serverless functions from attack is that legacy security protections require access to the infrastructure, operating system and/or network, none of which are available to the owner of the application. That is to say that in non-serverless environments, the owner of the application is able to install an appliance or software in or on the same environment or network as the application that needs to be protected. With the serverless execution model, as mentioned, the owner of the application cannot install such an appliance or software as the owner of the application does not have access to the underlying infrastructure or the operating system or the network.

To further clarify the aforementioned, the intrinsic nature of the serverless computing execution model dictates that the cloud provider dynamically allocate machine resources so that the same machine resource is used by multiple service consumers in an ever changing dance. Every few seconds (or even milliseconds in some cases) or minutes the user of the resource changes and a different user executes a different application or function on the same resource. For example, at present AWS Lambda functions are not allowed to run for longer than 5 minutes and if they do, they will be terminated. So, at the core of the serverless model there is an environment that allows the consumer to run code without provisioning or managing servers.

The cloud provider manages this dynamic allocation. Applications are merely 'renting' the resource by the second (or part thereof) or minute, the owner of the application is not allowed to access the infrastructure and may not even be aware (in any meaningful way) of what resource has been allocated for the application. All of the aforementioned limitations are implied and inherent in the serverless computing model. As such, any existing security solution that is based on protecting the resources and infrastructure is intrinsically not a viable solution.

One potential security alternative to the presently disclosed system is a Cloud-based offering (SaaS, software as a service), where a protection solution would be placed between the application and the users, and will inspect traffic. However, such a model would have severely detrimental performance repercussions for the running of the application. If the performance penalty (e.g. time lag) is too great, then the use of such a tool is unacceptable. When dealing with serverless environments a normal execution time may be a number of milliseconds. Thus, a protection mechanism that takes, for example, 200 ms to execute is not suited to protect a function that runs for 10 ms.

Moreover, all Cloud/SaaS protections would have to deal with the wide range of communication protocols that are used by the serverless applications, and will have to be installed in various locations where the functions are deployed. Logistically, such a solution is impractical, expensive and essentially unusable as the application owner does not have administrative access to the servers and infrastructure.

Disclosed herein is a Serverless Security Runtime Environment (SSRE) that includes two innovative components, a "Serverless Application Firewall" and a "Serverless Behavioral Protection Engine". The serverless application firewall system and service and Serverless Behavioral Protection Engine protect customer serverless applications from attacks, leakage of confidential information, and other security threats. The Firewall inspects input (and output), looking for malicious input or a deviation in input data (or output). The Serverless Behavioral Protection Engine monitors and observes the behavior of a serverless function during execution of the serverless function code.

The instant systems and methods disclosed herein are implemented on cloud computing platforms using serverless technology. An exemplary implementation of serverless technology is described in U.S. Patent Application Serial No. US 20180124194 A1 which is incorporated by reference as if fully set forth herein.

The serverless application firewall and serverless behavioral protection engine are a compound system and service that is provided to protect serverless applications from attacks, leakage of confidential information, and other security threats. In various embodiments, the firewall system and service and serverless behavioral protection engine can be implemented in conjunction with serverless, function as a service (FaaS), or event-driven computer environments. The serverless application firewall and serverless behavioral protection engine can be implemented as serverless function wrapper code, executable software whose execution precedes the serverless function, or any other relevant approach. Any form of implementations must ensure that the event data passes through the firewall, before it is consumed by the original serverless function, and that the output of the function can be inspected before being handed back to the caller. The manner of implementation must also assure that the serverless behavioral protection engine is able to monitor and observe the behavior of a serverless function during execution of the serverless function code.

The serverless runtime environment, upon receiving a related event, triggers the execution of the serverless function, providing the function with the event data. At that point, the serverless application firewall receives the event data before the function receives it, inspects it for potential attacks, and prevents such attacks from reaching the serverless function's main logic. In addition, the serverless application firewall may also inspect the function's output, and block any attempts to leak information out of the function.

When code of a serverless function is executed by the serverless runtime environment, the serverless Behavioral Protection Engine monitors the behavior of the original serverless function, and alerts or halts/blocks the function which was detected as behaving in an unwanted, unsafe or otherwise offending manner.

In one preferred embodiment, the SSRE includes both the serverless application firewall and the serverless behavioral protection engine. In another embodiment the SSRE includes only the serverless behavioral protection engine. In yet another embodiment, the SSRE includes only the serverless application firewall.

The present, innovative Firewall, provides a technical improvement over the legacy security tools by overcoming the aforementioned challenges facing these mechanisms. The present solution is a new technological tool to the technological problem of safeguarding serverless applications that heretofore have been inadequately protected due to inherent problems unique to the serverless environment. Until now, firewalls have stood between the server function and the user. Presently, the innovative firewall works from within the function itself or within the same runtime environment, no matter where the runtime environment is, or for how long the function executes. The security protection can be outside the function within the same runtime environment, or in any location that allows real time protection. For example, Amazon® may provide a way to execute $3^{rd}$ party code before, together or after the function executes.

The 'Firewall In a Function' (FIaF) model or firewall in the runtime environment model presently disclosed provides a security tool that is faster than any legacy mechanism that inspects input by running the input to a cloud to perform the inspection (see the example above of adding 200 ms to a 10 ms nano-function). Running the protection logic within the function or runtime environment removes the need to send data for inspection out of the serverless environment which would otherwise cause a severe degradation in performance (e.g. speed).

The present mechanism is also more efficient than any other mechanism that monitors the communication layer, because such mechanisms either monitor only a specific mode of communication (e.g. HTTP traffic) or otherwise have to deal with each and every communications protocol that can provide an event trigger. The present security system is a communication-protocol-agnostic security protection system.

The present mechanism is also scalable at the same rate as the serverless application is scaled. There is no need to add infrastructure to secure the serverless functions as they grow. In fact, it makes little sense to use servers and maintain server infrastructure in order to provide security for serverless functions. One of the biggest draw cards of serverless environments is the fact that the consumer does not have to provision and maintain servers of their own.

Another feature of the instant system, which is an additional improvement over the state of the art, is the ability of the system to be tested in any kind of environment (which is also relevant for the behavioral protection module discussed elsewhere herein). Since the security protection is embedded inside the function itself, it can already be tested during development, on the local machine of the developer, or in staging environment, or the like. Full blown security testing and verification can be done as early as the development phase.

The present mechanism is not merely an input filter, as so many of the existing security tools are. Rather, the serverless application firewall receives information about the execution context of the function, as well as all event data inputs, and performs a wide range of checks against serverless application layer attacks as well as inspecting the function output for anomalies, incongruencies and otherwise suspicious or sensitive output.

Practically speaking, existing solutions cannot be deployed "physically" in a serverless environment. There is no operating system environment that is accessible to the application owner, so there is no place to install any software. In addition, there is no physical server, so deploying an appliance in front of it (from a network topology point of view) is not an option.

The principles and operation of a Serverless Application Firewall according to the present invention may be better understood with reference to the drawings and the accompanying description.

The serverless application firewall system and service protect customer serverless applications from attacks, leakage of confidential information, and other security threats.

In contrast to ordinary network-layer or application layer firewalls, which inspect different protocols such as TCP, UDP, IP or HTTP, the instant serverless application firewall, inspects serverless functions' event data, when an event trigger occurs, in serverless runtime environments. Event data is the raw input that the function receives upon execution—these are arguments related to the event trigger type, used for the function's execution.

By monitoring the function's input data/payload prior to, or in conjunction with, function execution, the application firewall can detect and protect the function from application layer attacks, without having to deal with protocol implementation or perform network traffic inspection. Protocol implementation and network traffic inspection are common practices in legacy firewall products, but are not necessary in the instant system.

Furthermore, the instant method for malicious payload detection is an improvement over the state of the art as the detection methods used are relevant for the specific serverless environment, and programming language used by the runtime, which improves accuracy and efficiency. For example, if the function is written in Python, the instant method and system reduces overhead relative to legacy systems by only checking for Code Injection attacks that target Python. The targeted detection improves performance and reduces the chances for false positives.

Another feature of the system is referred to herein as "normal application input profiling". The innovative application firewall collects sample data from events, runs statistical analysis on event inputs, and after a period of time, is able to provide a "normal input profile". Based on the profile, the firewall understands which inputs are expected and what the format and size/length should be. The firewall can be configured to only accept "normal" values, where normal is defined by the profile.

The profiling/learning process is external to the function itself. This is necessary in order for data persistence and so that the profile information/data can be shared with other function instances.

The serverless application firewall receives information about the execution context of the function, as well as all event data inputs/payload, and performs a wide range of checks against serverless, application-layer attacks. Once an attack is detected, the firewall can either alert the system owner, or block the function from executing with the malicious input. Even if the event data/payload is suspicious, the system can be likewise configured to alert the administrators and/or block execution of the function with the suspicious event input data/payload.

Referring now to the drawings, FIG. 1 illustrates a flow diagram of the serverless application Firewall process. The flow diagram discloses the function execution, including invocation of the firewall process. Most serverless vendors offer compute runtimes, also known as function as a service (FaaS) platforms, which execute application logic but do not store data. The common programming model for serverless applications is referred to as event-driven computing, where the serverless functions' code is executed as a result of an event trigger.

In step 100, an event trigger occurs. In step 102 the event data is input into the runtime environment. The original serverless function code is invoked at step 104. The Context data (i.e. data relating to the context of the function execution) and event data are provided when the function is executed. The innovative process begins at step 106 by inspecting input of the serverless function so as to ascertain whether the input contains malicious, suspicious or abnormal data. In one embodiment, input is inspected by the Serverless Application Firewall, at step 106. The input of the serverless function is inspected so as to ascertain whether the input contains malicious, suspicious or abnormal data. The serverless application firewall operates in a same runtime environment as the serverless function. The firewall process receives the context data and the event data and performs the following actions:

1. Step 1060—Event message classification (detect event type);
2. Step 1062—Event message parsing (parse based on event type);
3. Step 1064—Clearance of irrelevant data (some fields are irrelevant for inspection as they do not affect execution of the code of the original serverless function—this is done to improve performance)

4. Step 1066—Data decoding when applicable (decode encoded fields). Relevant data decoding techniques are applied, depending on a set of pre-defined decoding methods such as, but not limited to: URL-decoding, Base64 decoding, Zip deflating, and so forth;
5. Step 1068—Malicious payload detection using a wide range of techniques known in the art;
6. Step 1070—If the payload is safe, the function code is allowed to execute normally at Step 120.
7. Step 1072—If the payload is unsafe (e.g. contains malicious, suspicious or abnormal data), a security action is taken at Step 1074. The security action may include one or more of, for example, raising an alert, halting execution, preventing the serverless function from executing, removing the malicious, suspicious or abnormal data from the input and/or raise an exception in the code of the serverless function.

At Step 1076 generating a log entry of detection of the malicious, suspicious or abnormal data, and generating forensic information related to execution of the serverless function. The forensic information can be used to generate a knowledge base (e.g. in a database) of malicious activities.

Figure 1A:
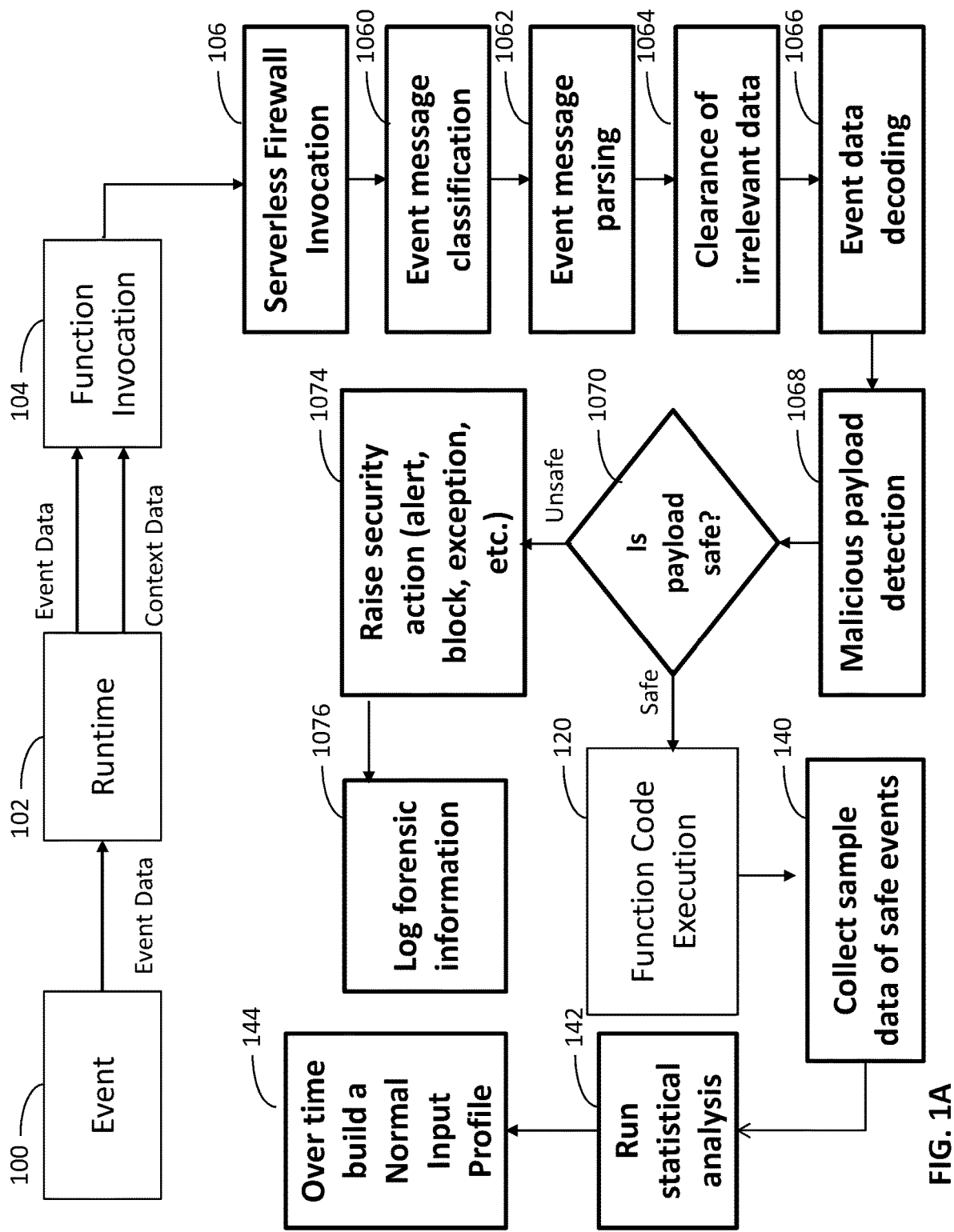
FIG. 1A is a flow diagram of the serverless application Firewall process including steps of a process for building a normal input profile.

In some embodiments, the firewall creates a profile of what normal input looks like. The profile is referred to herein as a "Normal Input Profile". Essentially, the normal input profile spells out what the acceptable parameters of input/event data are. FIG. 1A is a flow diagram of the serverless application Firewall process depicted in FIG. 1 including steps of a process for building a normal input profile. Steps up to and including step 120 are the same as those depicted in FIG. 1. The details described above in relation to those steps are likewise the same and considered as if repeated here in full.

In order to create the profile, in step 140 the firewall collects sample data from event data where no malicious or suspicious payload was detected. In step 142 the firewall does a statistical analysis of the event data. In step 144 the firewall builds the normal input profile over time by extrapolating acceptable parameters from the statistical analysis.

The profile includes information such as what format a normal event message should be in, what is considered normal content of the message, what size or length the message should be and so on. The information is distilled into acceptable parameters including, at least one of, an expected format of an event message in the even data, expected content of the event message, and an expected size or length of the event message.

Once the profile has been created or built over time, the firewall uses the learned profile to screen new events and event data. New event data conforming to the Normal Input Profile is allowed while unknown input/event data not conforming to the normal input profile is blocked or acted against. Malicious data is also more easily detected by the firewall as the malicious data does not conform to the normal input profile, and is thus blocked and/or one of the aforementioned actions is taken (raising an alert, halting execution, preventing the serverless function from executing, removing the malicious, suspicious or abnormal data from the input and/or raise an exception in the code of the serverless function).

Alternatively or additionally, a set or sets of wanted and/or unwanted input data is predefined. The wanted data is a white list of input data that is deemed acceptable and safe. The unwanted input data is a blacklist of input data that is considered unsafe. The set(s) can be defined using any technique known in the art, such as, for example, pattern matching, e.g. regular expressions. Once the sets of wanted and unwanted input data are defined, the firewall allows the serverless function to execute when detecting wanted input data and takes action (as described above) when unwanted or unknown input data is detected.

In one alternative embodiment, only the wanted set of inputs (whitelist) is defined. This is known as a positive security approach. Anything that is not on the whitelist (set of wanted input data) is acted on. Anything on the whitelist is allowed.

In another alternative embodiment, only the set of unwanted inputs (blacklist) is defined. This is a negative security approach. Only input data on the black list is acted against. Any other data is allowed to execute.

In yet another alternative embodiment, sets of both wanted and unwanted input data are defined. Input data corresponding to the wanted set is allowed to execute. Input data corresponding to the unwanted set is acted upon. Unknown input data which does not correspond to either the wanted or unwanted sets is also acted upon.

Figure 1B:
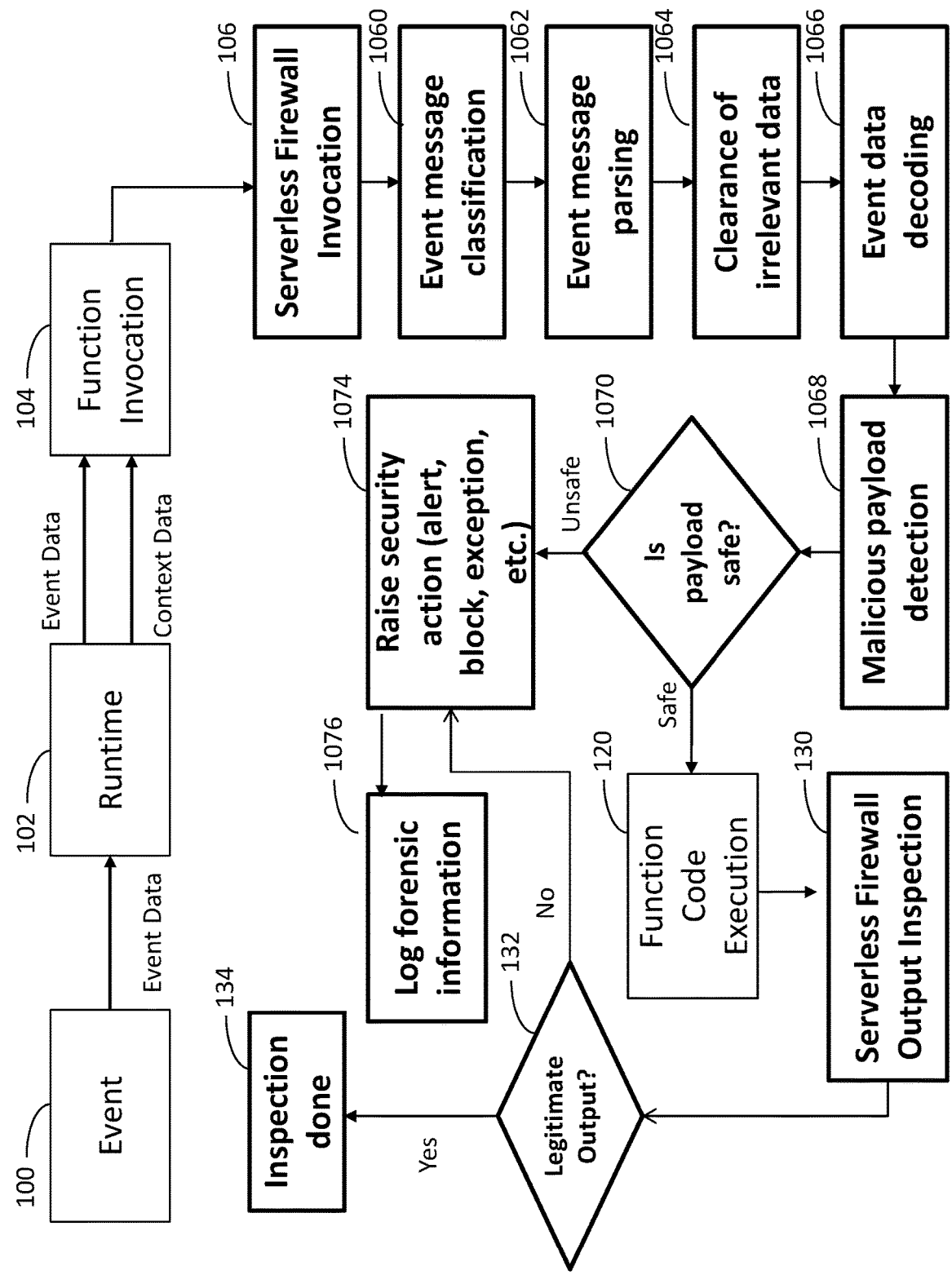
FIG. 1B is a flow diagram of the serverless application Firewall process including steps of an output inspection.

FIG. 1B is a flow diagram of the serverless application Firewall process depicted in FIG. 1 including steps of an output inspection process. Steps up to and including step 120 are the same as those depicted in FIG. 1. The details described above in relation to those steps are likewise the same and considered as if repeated here in full.

As a result of the function code executing in step 120, there is an output. In step 130 the output of the original serverless function is inspected by the serverless application firewall. If the firewall determines that the output is legitimate then at decision step 132, the firewall inspection process terminates at step 134. On the other hand, if the output is deemed suspicious (e.g. including unexpected data, sensitive data, etc., see below for further details), then at decision step 132, the process progresses to step 1074 and raises a security action and proceeds from there as described above.

In order to determine whether the output data is legitimate at step 132, the firewall compares the output data to a profile and/or a list(s) of acceptable and/or unacceptable output data. As with the input data, either a profile of normal output data is built or sets of wanted and/or unwanted output data are predefined.

In one embodiment, a "Normal Output Profile" is built. In order to create the profile, the firewall collects sample data of output that was deemed non-malicious. The firewall does a statistical analysis of the output data and builds the normal output profile over time by extrapolating acceptable parameters from the statistical analysis. New output data that conforms to the Normal Output Profile is allowed while output data that does not conform to the normal output profile raises an alert, etc. as described elsewhere.

Alternatively or additionally, a set or sets of wanted and/or unwanted output data is predefined. The wanted data is a white list of output data that is deemed acceptable and safe. The unwanted output data is a blacklist of output data that is considered unsafe. The set(s) can be defined using any technique known in the art, such as, for example, pattern matching, e.g. regular expressions. Once the sets of wanted and/or unwanted output data are defined, the firewall inspects the output data and does nothing when the output data matches those in the wanted set or does not match those in the unwanted set. However, when the output data matches output data on the unwanted set or does not match output data on the wanted set, the firewall raises an alert, halts execution, raises an exception in the code of the serverless function, generates a log entry and/or generates forensic information.

In one alternative embodiment, only the wanted set of output data ('whitelist' or 'white list') is defined. This is known as a positive security approach. Anything that is not on the whitelist (set of wanted output data) is acted on. Anything on the whitelist is allowed.

In another alternative embodiment, only the set of unwanted output data ('blacklist' or 'black list') is defined. This is a negative security approach. Only output data on the black list is acted against. Any other output data is allowed.

In yet another alternative embodiment, sets of both wanted and unwanted output data are defined. Output data corresponding to the wanted set is allowed. Output data corresponding to the unwanted set is acted upon. Unknown output data which does not correspond to either the wanted or unwanted sets is also acted upon.

Features of the Serverless application firewall

As discussed above, one of the steps employed by the Firewall is to inspect the serverless function input and output. This inspection is executed regardless of communication protocol related to the event that caused the function to execute. This is a significant improvement over legacy firewalls, Web Application Firewalls (WAFs) and cloud WAFs that generally inspect network traffic only (i.e. HTTP/HTTPS traffic). Such a capability is crucial in the serverless environment since Serverless Functions are invoked by a wide range of event types, such as, but not limited to: SMS messages, Message Queue notifications, Email notifications, SQL database changes, Code commits to code repositories, HTTP API calls, MQTT events related to IoT device telemetry, and so forth. Therefore, being able to inspect the event data inside the function has a tremendous benefit, as the security protection does not have to learn each and every communication protocol, but rather inspects the input itself.

Furthermore, while a standard network firewall usually has to inspect the network traffic, the present, innovative system does not function on the transport layer and therefore does not need to inspect network traffic. Nonetheless, the system is still able to detect and block application layer attacks such as SQL Injection, Cross-Site Scripting, Buffer Overflows, Remote File Inclusion, Local File Include, Code Injection, OS Command Injection, and so forth.

Among other features of the Firewall is the ability to report on the aforementioned attacks. The innovative Firewall is able to report to any security and/or administrative entity, such as, but not limited to: security information and event management systems, a system log, etc.

Besides for recognizing clear and obvious attacks at the application layer, the innovative Firewall also reports on suspicious behavior that may be indicative of a security breach. Certain behaviors and/or execution issues that are detected may arise during execution or even after execution of the function. These suspicious or indicative behaviors and/or issues include, but are not limited to: excessive use of system resources, long execution periods, error scenarios, etc. An innovative behavioral model is discussed below with respect to the serverless behavioral protection engine discussed below.

When the Firewall notes any of the aforementioned behaviors or issues, the firewall sends a report to an administrative and/or security entity for follow up. Alternatively or additionally, the Firewall may halt execution of the function and/or raise an exception in the function code.

If suspicious input is detected, where it is not conclusive that the input is malicious, then the serverless application firewall informs the behavioral protection engine (if one is present) to monitor more closely how the suspicious input affects the system and to apply a more strict and/or restrictive security policy for this specific execution.

As mentioned above, the Firewall inspects the output of the function as well as the input. By inspecting the output, the innovative Firewall is able to detect sensitive data leakage, over-verbose error messages and/or drastic anomalies in response content or size. If the output is determined to be malicious or at least suspicious, the Firewall may raise an alarm e.g. by sending a report to a security or administrative entity, as above. Additionally or alternatively, the Firewall may halt execution of the function (if still relevant) and/or raise an exception in the function code (e.g. to prevent or warn against running the same function in the future).

Serverless Behavioral Protection Engine

Another security function disclosed herein is a Serverless Behavioral Protection Engine. The Serverless behavioral protection engine service and system is provided to protect serverless applications from attacks, leakage of confidential information, and other security threats. In various embodiments, such a serverless behavioral protection engine system and service can be implemented in conjunction with serverless, Function as a Service (FaaS), or event-driven computer environments. The serverless behavioral protection engine can be implemented as a serverless function wrapper code, an executable software whose execution precedes the serverless function, or any other approach, which allows the serverless behavioral protection engine to monitor and observe the behavior of a serverless function during execution of the serverless function code.

When code of a serverless function is executed by the serverless runtime environment, the serverless Behavioral Protection Engine monitors the behaviors and actions of the original serverless function, and alerts or halts/blocks the function which was detected as behaving in an unwanted, unsafe or otherwise offending manner.

The present innovation generally relates to a serverless (function as a service) application firewall system and service, including in particular such systems and services implemented in serverless computing or other event-driven function execution environments.

As discussed above, in a serverless environment, the person who owns the application does not have direct access to the underlying infrastructure which included the servers, network equipment, operating systems and so forth. As a result, the application owner is not able to deploy and use traditional security protections such as Firewalls, Intrusion Prevention, Anti-Virus, Malware Threat Prevention, and so forth. Again, it is made clear that the structure of the serverless model is not a business model but rather an architecture that provides many benefits to consumers including optimized computer resources, a complex resource sharing implementation which provides all of the benefits that have been enumerated above.

The serverless behavioral protection engine system and service disclosed herein protects serverless applications from performing unauthorized and illegitimate actions as a result of malicious attacks. The Serverless Behavioral Protection Engine serves as a trusted execution environment for the serverless function and limits the ability of each individual serverless function to execute malicious code or to access sensitive files in an unauthorized manner. In a sense, while the Serverless Behavioral Protection Engine monitors and enforces approved actions on the function-level, it provides confidence and reliability on the entire serverless application to which the function belongs.

In most serverless platforms, access to external services and resources is granted based on an Identity & Access Management (IAM) model, that is applied at the function level. For example, the developer of the system or the administrator, will grant the function permissions to READ, WRITE (or other types of available permissions) for certain resources. This permissions model is applied to the function as a whole and cannot be applied to specific system processes that are spawned or executed by the function.

The Behavioral protection engine can apply an IAM permission model on each process or child-process that is executed by the function (one function may execute multiple child-processes as part of its normal operation). In essence, the behavioral protection model can restrict access to resources for specific child-processes, which provides a much more granular security model. For example, the developer may choose to allow a function to access a cloud file storage bucket, which means that by default, any process or sub-process launched by the function will inherit the same permission. However, innovatively, a user of the instant system can decide to deny such access from child processes that may get launched by the function.

Figure 2:
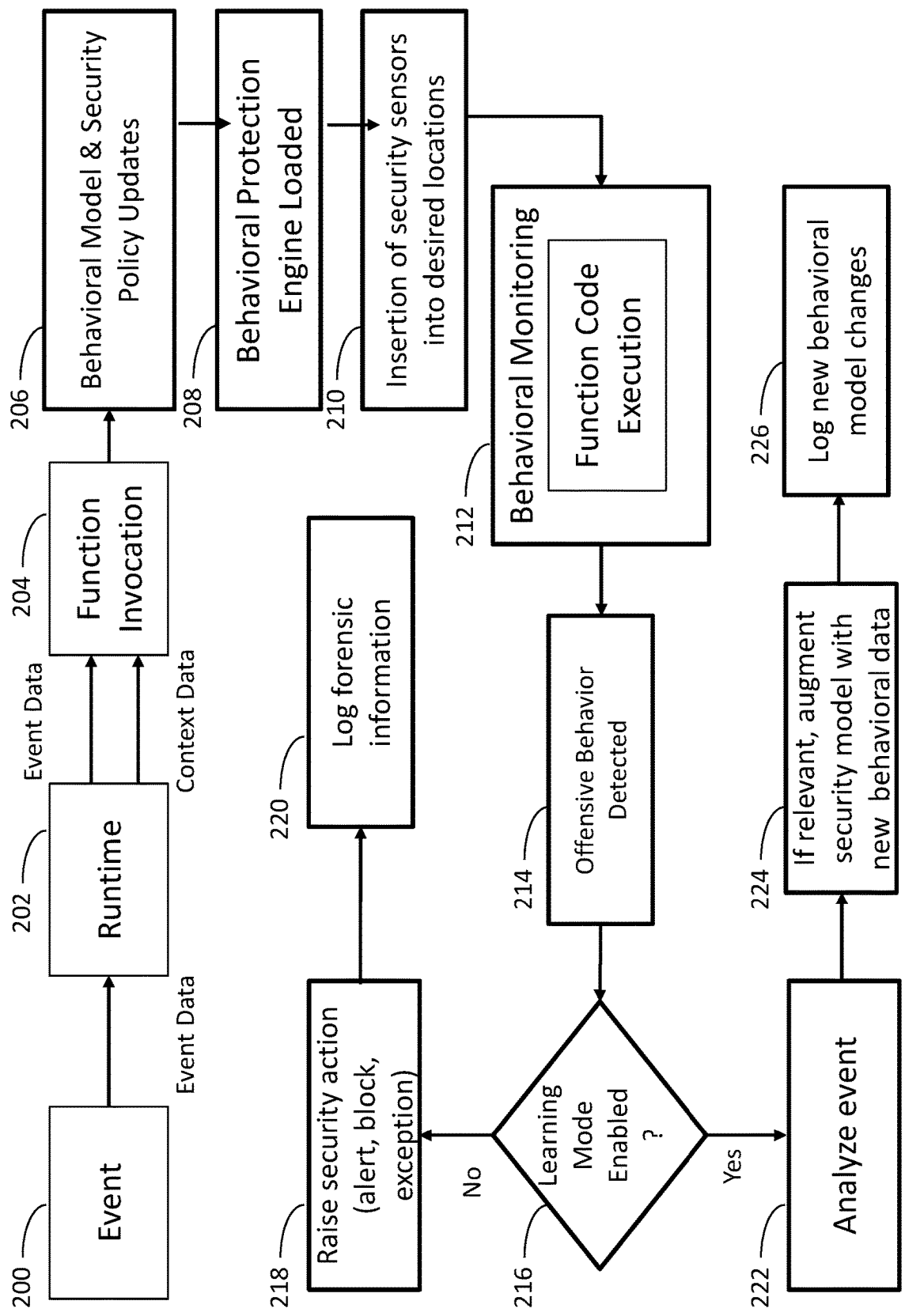
FIG. 2 is a flow diagram of the serverless behavioral protection engine process.

FIG. 2 is a flow diagram of an exemplary serverless behavioral protection engine process. In step 200, an event trigger occurs. In step 202 the event data is input into the runtime environment. The serverless function is invoked at step 204. The Context data (i.e. data relating to the context of the function execution) and event data are provided when the function is executed. At step 206 the innovative behavioral model and security policy are updated. Updates can be delivered in various ways, for example: retrieving the update from a remote cloud storage location; retrieving the update from an environment variable that is provided to the function upon initial execution; retrieving the update from a remote network resource such as a URL; and so on and so on.

At step 208 the innovative Behavioral Protection Engine is loaded. At step 210 security sensors are inserted into desired location in the runtime environment. Sensors can be inserted in a multitude of ways such as, but not limited to: through dynamic hooking; by embedding the security sensors in the underlying serverless runtime; by providing a function code wrapper; and many more.

At step 212 the function code is executed within the behavioral monitoring environment. If the function executes in a normative manner, then the function is allowed to execute as usual. However, if the function displays offensive behavior, then this offensive behavior is detected in step 214. In decision step 216 the learning mode is either enabled or not enabled. If the learning mode is not enabled, then in step 218 a security action is raised. For example, the security action may include one or more of: generating an alert, blocking the function execution and/or raising an exception in the function code. A log is generated in step 220 including the forensic information gleaned from offensive behavior (e.g. a malicious attack).

If the learning mode is enabled, then in step 222 the event including the offensive behavior is analyzed. If relevant, at step 224, the security model is augmented with new behavioral data from the detected offensive behavior. In step 226 a log of the changes to the new behavior model is generated.

Innovatively, the serverless behavioral protection engine protects serverless functions against attacks in real time. This includes protecting serverless functions, inter alia, from: executing malicious code, leaking information over network traffic to external entities, connecting to unauthorized remote network locations, unauthorized file access, etc. The process also logs actions and interactions performed by the original serverless function code as well as security events occurring during function execution.

In one embodiment, in order to know what behavior is acceptable and what is not, the behavioral protection engine builds a profile of normal behaviors and actions by collecting sample data from the behaviors and actions and statistically analyzes the sample data to extrapolate parameters for normal behaviors and actions. Building the profile of normal behaviors and actions is similar, mutatis mutandis, to normal input and output profiles described above.

Figure 2A:
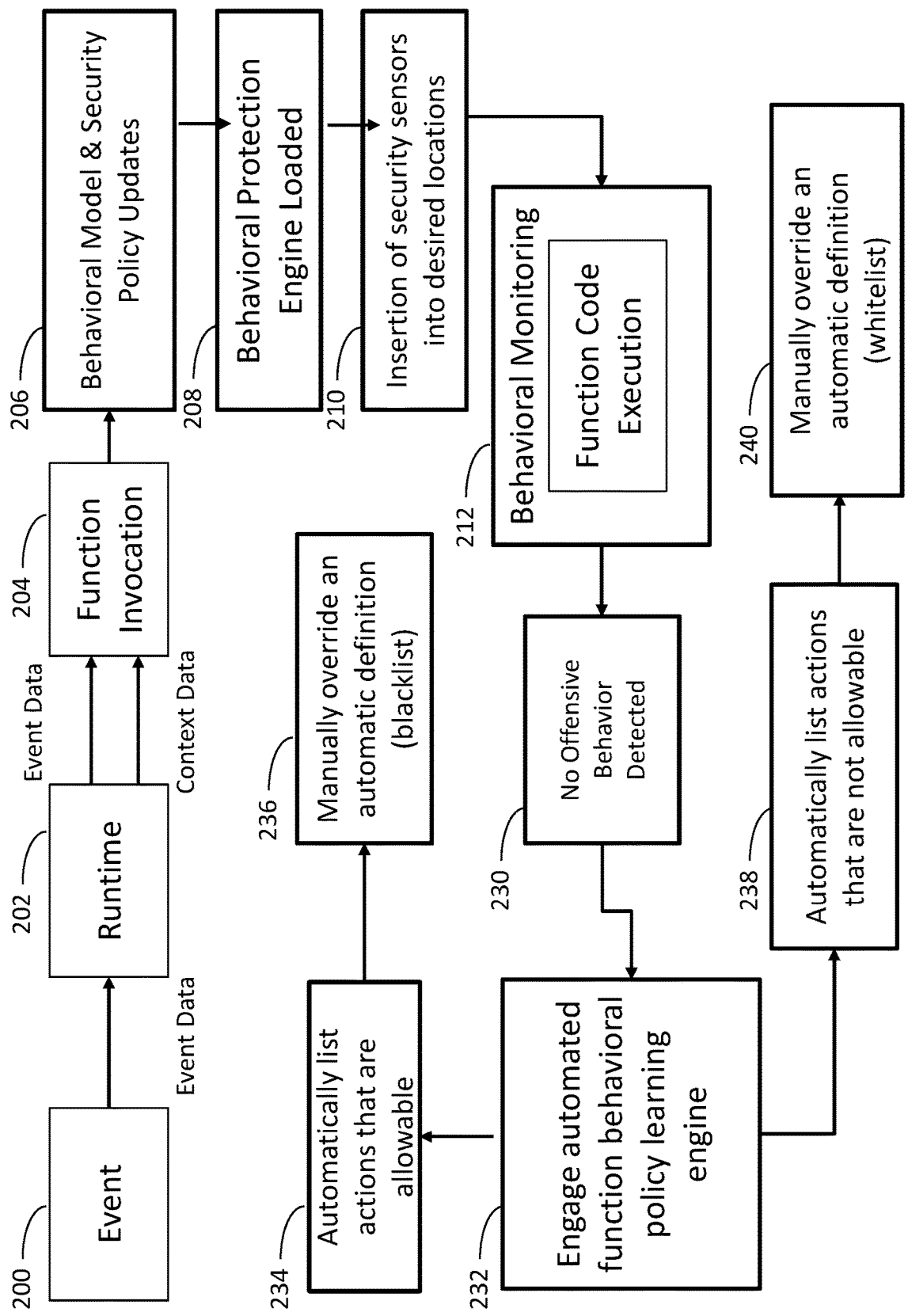
FIG. 2A is a flow diagram that includes the steps for learning normative behavior.

The serverless behavioral protection engine learns normal function behavior over time in order to determine or recognize the normal behavior of functions and thus the abnormal, suspicious or even offensive behavior. The serverless behavioral protection engine provides recommendations and/or enacts automatic enforcement of actions, based on automated function behavioral policy learning. FIG. 2A is an extension of the flowchart of FIG. 2, that only includes the steps for learning normative behavior (i.e. building normal behavior profile, as described above). It is made clear that the processes of FIG. 2 and FIG. 2A are applied concurrently and only differ after step 212. Whereas at step 214 of FIG. 2 offensive (or suspicious) behavior is detected, at step 230, no offensive behavior is detected. At step 232 an automated function behavioral policy learning engine deduces the normal function behavior over time, through one or more learning processes. The one or more learning techniques may or may not be selected from the group which includes, but is not limited to:

1) Using a machine learning, statistical-based approach to cluster good or malicious behavior over time to generate a machine learning model. The machine learning model is then used to classify and detect good and/or bad behaviors.

2) Using machine learning or other statistical based analysis to learn the correct order and sequence of operations and interactions within the function or across multiple functions in the same serverless application, and then enforcing good behavior and/or detecting anomalies in real time.

3) Using machine learning or other statistical based analysis to learn what external resources are accessed or used by the serverless function in the normal/legitimate case, and then enforce use or accessing of only the recognized resources. Moreover, the automated behavioral policy engine can learn what are the exact operations performed on the specific (approved) resources (for example, a READ-ONLY operation on a specific database table, etc.) and then generate a policy. The policy dictates that future executions of the given serverless function are only allowed to perform the specific, learned action on the specific resource. The engine enforces this policy by blocking any attempts to perform any actions (e.g. a WRITE operation on the aforementioned database table) other than those actions dictated by the policy.

Application owners/administrators can "whitelist" actions (i.e. define a whitelist of actions) that the function is allowed to perform (step 234). Conversely, owners/administrators can define a "blacklist" of actions (step 238) that the function should be prevented from doing. The actions that are blacklisted or whitelisted are based on the recommendations from the serverless behavioral protection engine automated function behavioral policy learning discussed heretofore.

Alternatively or additionally, the instant system allows the administrator of the system to manually add logic or logic overrides by configuring whitelists (step 240) of behaviors that override, add to or contradict the automated definitions. Conversely, the administrators may manually add logic or logic overrides by configuring blacklists of behaviors that override, add to or contradict the automated definitions (step 236).

For example, the administrator may decide to manually limit a given function from connecting to external network resources on the internet, and only allow the function access to a pre-defined set of cloud resources. Connecting to external network resources may be a behavior that is automatically defined by the learning engine as allowable (or simply normal) in step 234, however the system administrator may decide to create or configure a blacklist that limits the cloud resources the function is allowed to connect to.

Conversely, in another example, the administrator may allow the function to perform a behavior that might be considered risky in most cases (e.g. automatically defined as an action that is not allowable, in step 238), but is acceptable under certain circumstances, by generating or configuring a whitelist that includes the risky action (in step 240).

In one embodiment, only a set of wanted behaviors and actions is predefined. Action is taken when monitored the behaviors and actions are not included in the predefined set of wanted behaviors and actions. This is referred to as a positive protection approach.

In another embodiment, only a set of unwanted behaviors and actions is predefined. Action is taken when monitored the behaviors and actions are included in the predefined set of unwanted behaviors and actions. This is referred to as a negative protection approach.

In yet another embodiment, sets of both wanted and unwanted set behaviors and actions are predefined. Action is taken when monitored the behaviors and actions are included in the predefined set of unwanted behaviors and actions or unknown (and therefore not included in the set of wanted behaviors and actions).

The protection provided by the serverless behavioral protection engine is coupled with the serverless function and executes the detection and protection logic in real time, together with the function. The security protection can be outside the function within the same runtime environment, or in any location that allows real time protection. For example, Amazon® may provide a way to execute $3^{rd}$ party code before, together or after the function executes.

By placing the security protection inside the serverless function itself or together with the function in the same runtime environment, the serverless behavioral protection engine provides behavioral protection to serverless functions at the execution level. It does not require any kind of inspection of protocols, or analysis of input over network protocols as the protection is done based on the behavior of the function itself, inside the execution environment.

The serverless behavioral protection engine does not require any interaction with external resources in order to enforce the policy. However, the serverless behavioral protection engine does interact with the external sources for learning purposes and for gathering threat intelligence. As above, running the protection logic within the function removes the need to send data for inspection out of the serverless environment, which would otherwise cause a severe degradation in performance. In fact, all the benefits discussed about with relation to the serverless application firewall are relevant here as well.

Furthermore, with the serverless behavioral protection engine, the ability to inspect the serverless function execution behavior over time enables the serverless behavioral protection engine to learn what normal behavior looks like, and build a dynamic and adaptive security policy after even a short period of learning, which can potentially take place during a staging deployment phase or a QA phase.

Figure 4:
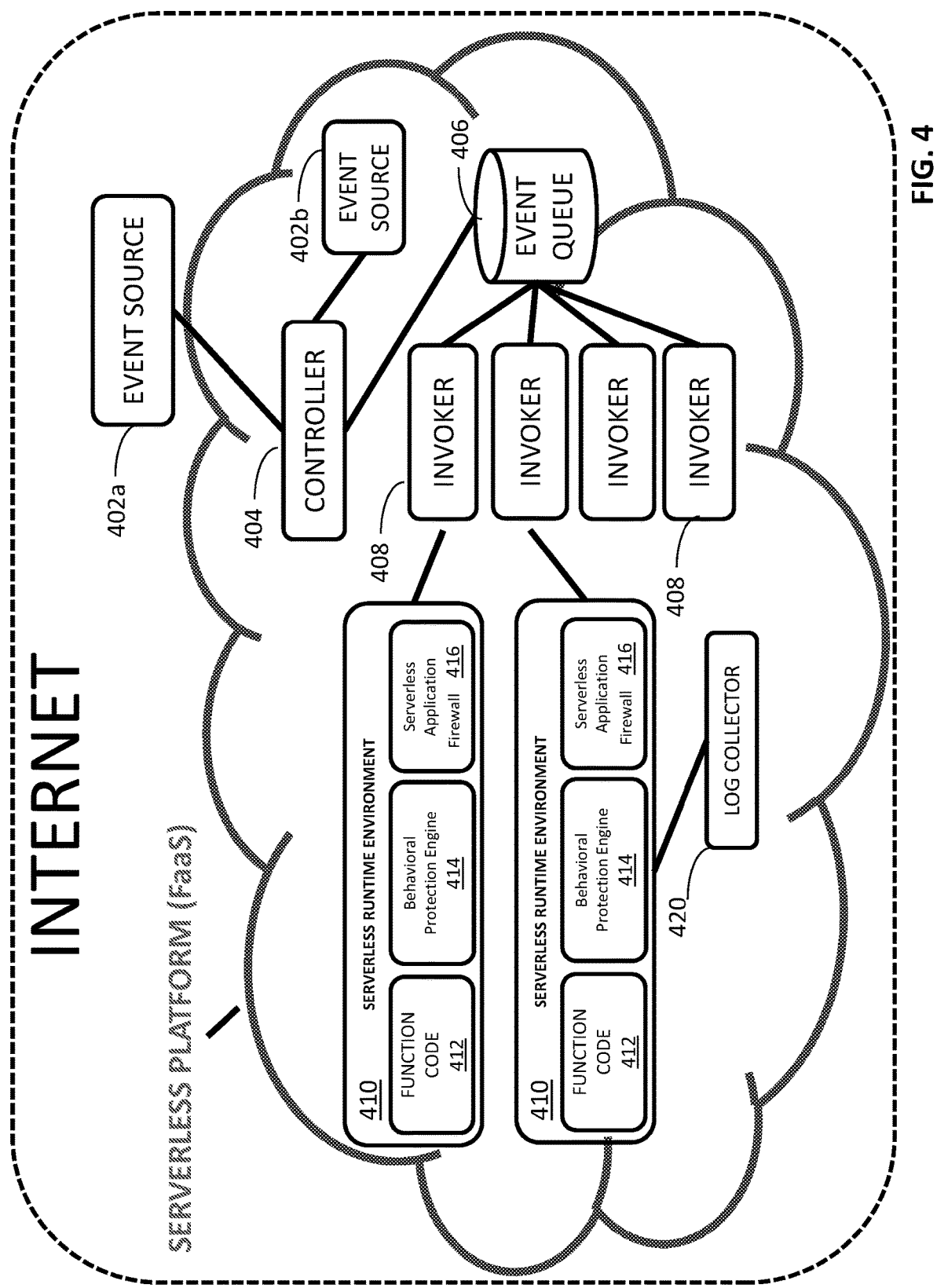
FIG. 4 is a concept diagram of an exemplary implementation of the SSRE.

Until now the serverless application firewall and the serverless behavioral protection engine have been described and detailed as separate entities. In a preferred embodiment of the invention, there is provided a system for protection a serverless application, this system is embodied in a Serverless Security Runtime Environment (SSRE) which comprises the aforementioned two components, i.e. the serverless application firewall and the serverless behavioral protection engine. FIG. 4 is a concept diagram of an exemplary implementation of the SSRE. The diagram depicts a cloud-based platform on which the Serverless Security Runtime Environment (SSRE) runs. The platform is depicted within a cloud and the platform itself is within the Internet. Event triggers originate from an event source 402a, 402b. There could be an event coming from an Internet host (such as an email) 402a, and there could be what is referred to as a "cloud-native event", which is an event that occurs inside the serverless/cloud platform 402b (such as a cloud-DB modification). A hardware controller 404 receives the event requests and manages the handling of the requests. The Controller may be a Central Processing Unit (CPU) formed of one or more processors, e.g., hardware processors, including microprocessors, for performing functions and operations detailed herein. The processors are, for example, conventional processors, such as those used in servers, computers, and other computerized devices. For example, the processors may include x86 Processors from AMD and Intel, Xenon® and Pentium® processors from Intel, as well as any combinations thereof.

The controller organizes the event requests into an event queue 406. For each event, an invoker 408, that invokes a runtime environment 410 as detailed elsewhere herein. Each serverless runtime environment 410 includes the function code 412 that is executed, a serverless application firewall 414 and a behavioral protection engine 416. A log collector 420 is in communication with the runtime environments. All the logs from the execution of the functions in the runtime environments 410 are stored in the log collector 420.

The serverless application firewall is configured to inspect input of the serverless function so as to ascertain whether the input contains malicious, suspicious or abnormal data. The behavioral protection engine is configured to monitor behaviors and actions of the serverless functions during execution thereof.

While the runtime environment can be deployed with one or the other component it is preferable to employ both components together. Using both components provides the two layers of protection, which is a more holistic solution than any single component. Thus, the Behavioral Protection Engine provides coverage where the Firewall is lacking and vice versa.

As described above, when the function gets invoked, it receives an event as input for the execution of the function. The event input is an entry point to the serverless application, and can be used as an attack vector, e.g. an attacker can place malicious input inside the event. In such a case, the serverless application firewall comes into play. The firewall inspects all event inputs to the function before using the input. If an attack payload is found, the firewall will block the attack (e.g. block execution of the function).

However, some functions may get invoked and operate on data that does not come in the event itself. For example, a serverless function that is invoked periodically using a scheduler (e.g. invokes the function at exactly 12:00 PM every day). When the function gets invoked, the event data from the scheduler is benign (simply a trigger firing at a certain time), and an attacker cannot manipulate the event input (since the event input is not external facing). However, when the function is invoked every day, it sends an outbound HTTP request (referred to as an API call), which fetches data from a remote location, which might be an un-trusted public data source. For example, the function sends an API call to fetch data from a web service that provides stock quote information. Once the function gets the response for the API call, the function performs the desired computation on the data. However, since the web service might be an internet server belonging to a 3rd party, it may contain malicious input, intended to manipulate and harm the serverless function.

In such a case, the attack vector would be in the form of a malicious user who takes over the remote web service from which the function pulls data on a daily basis, poisons that data, and when the function performs the computation on the data, the function might execute malicious code.

Since the serverless application firewall (and any kind of application firewall known today), only inspects input that is sent in the event (or in the case of a web application firewall, in the incoming HTTP request), the firewall is not suited (or situated) to analyze outbound API calls, from the function, to fetch data that might be poisoned. In addition, it is not practical to inspect outbound traffic and incoming response data, since the firewall does not necessarily know how to handle the data format or protocol (it might be binary data, or any other type of data) of the incoming data. As such, the firewall, in the aforementioned example, cannot inspect the incoming data from the API call.

Enter the Serverless Behavioral Protection Engine. The serverless behavioral protection engine makes sure that any malicious behavior, such as the malicious behavior caused by the aforementioned poisoned data will be blocked and will not harm the system. The behavioral engine monitors the incoming data that arrives in response to the outbound API call. Having learned normal behavior, the behavioral engine recognizes suspicious or malicious behavior as a result of the poisoned data. The behavioral engine will report and/or block execution of the function.

Figure 3:
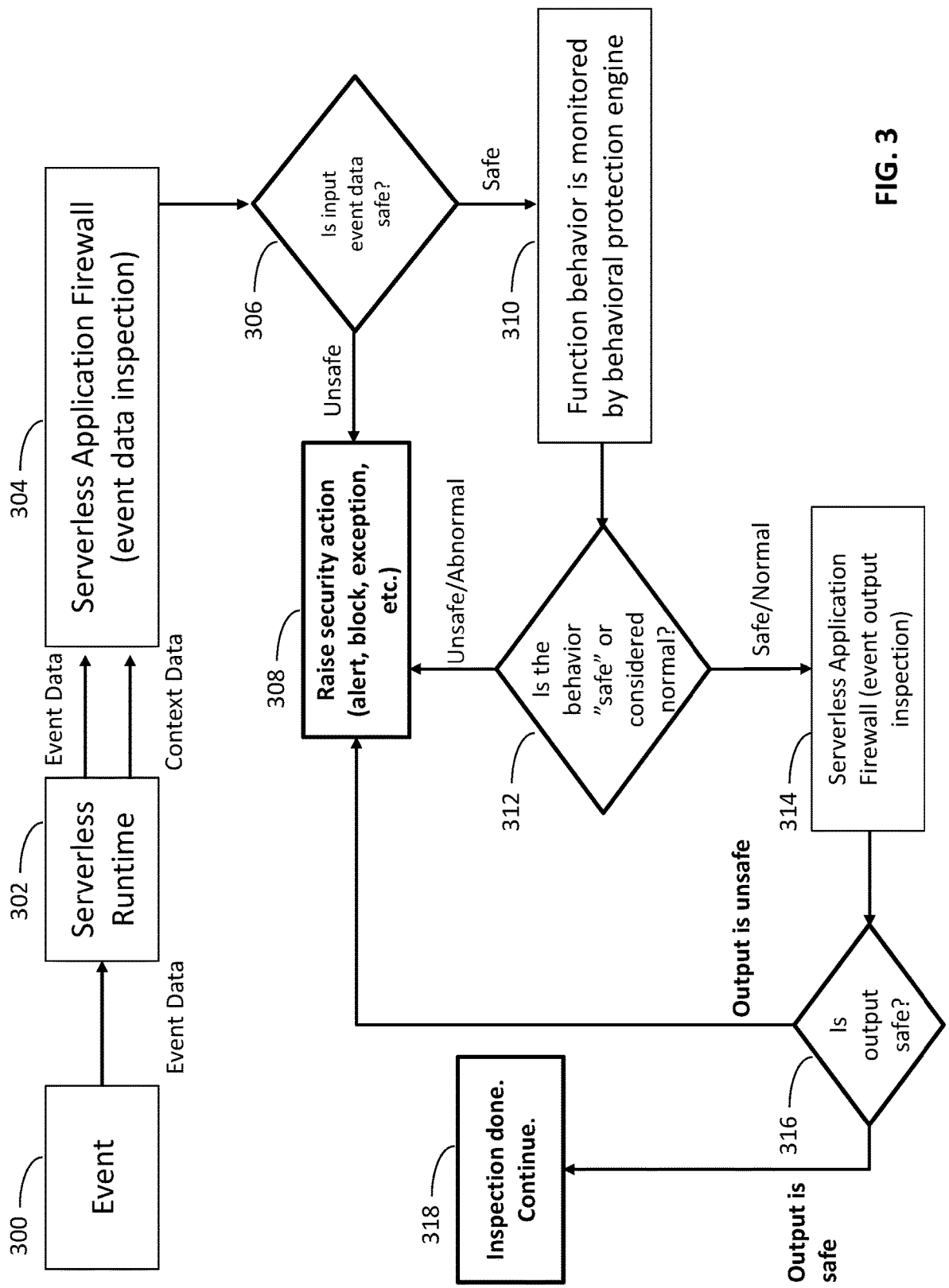
FIG. 3 is a flow chart of a serverless function running in the innovative Serverless Security Runtime Environment (SSRE)

FIG. 3 illustrates a flow chart of a serverless function running in the innovative Serverless Security Runtime Environment (SSRE). As explained, the SSRE executes a function running flows of FIGS. 1 and 2 concurrently. Steps 100, 102 and 104 (FIG. 1, 1A, 1B) are the same as steps 200, 202 and 204 (FIG. 2, 2A). Function code execution in steps 120 (FIGS. 1, 1A, 1B) and 212 (FIG. 2, 2A) are likewise the same steps. Details of the function steps are not repeated here, for the sake of brevity, although it is made expressly clear that all of the detailed descriptions discussed above in relation to the Serverless Application Firewall and the Serverless Behavioral Protection Engine are to be seen as if repeated in full here.

At step 300 an event trigger occurs. In step 302 the event data is input into the runtime environment. At step 304, the Serverless Application Firewall inspects the event data (input) of the serverless function so as to ascertain whether the input contains malicious, suspicious or abnormal data. At decision step 306 the firewall determines whether the input is safe. If the input is unsafe, then at step 308 an action (security action) is taken.

If the Firewall determines the input to be safe then the function is allowed to run and at step 310 the Behavioral Protection Engine monitors the behavior and actions of the function during execution thereof. At decision step 312, the engine decides whether the behavior is safe/normal or unsafe/abnormal. If the behavior is determined to be unsafe or abnormal then a security action is taken at step 308. If the behavior is determined to be safe/normal, then at step 314, the Serverless Application Firewall performs event output inspection on the function output. At decision step 316, the Firewall determines if the output is safe/normal or unsafe/abnormal. If the output is determined to be unsafe or abnormal, a security action is taken at step 308. If the output is determined to be safe or normal, then at step 318, the inspection is complete and the system proceeds to the next task.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method comprising:
based on detection of an event that is a trigger for a serverless function, an application firewall inspecting input for the serverless function prior to execution of the serverless function to determine whether the input contains unsafe data, wherein the serverless function and the application firewall are in a same runtime environment and wherein inspecting the input to determine whether the input contains unsafe data comprises determining whether the input conforms to a profile of normal input built from samples collected from past events determined to have safe data;
based on a determination that the input does not contain unsafe data, allowing the serverless function to execute with the input and collecting sample data from the event; and
based on a determination that the input includes unsafe data that is malicious or abnormal, raising a security action.

2. The method of claim 1, wherein raising a security action includes one or more of:
raising an alert,
preventing the serverless function from executing,
removing said malicious data from said input,
raising an exception in code of the serverless function,
generating a log entry of detection of said malicious data, and
generating forensic information related to execution of the serverless function.

3. The method of claim 1, wherein said application firewall inspects said input at an application layer.

4. The method of claim 1, wherein the application firewall inspecting said input comprises the application firewall classifying an event message of the event and parsing the event message based on an event type determined from the classifying.

5. The method of claim 1, wherein the application firewall inspecting the input comprises the application firewall decoding encoded fields after parsing an event message of said event.

6. The method of claim 1, wherein the application firewall inspecting said input comprises the application firewall clearing fields in said event which do not affect execution of the serverless function.

7. The method of claim 1, further comprising:
updating the profile of normal input based, at least in part, on the collected sample data.

8. The method of claim 7, further comprising extrapolating acceptable parameters based on statistical analysis of the sample data and additional sample data collected from other events over time for which no unsafe data was detected and building the profile of normal input based on the acceptable parameters, wherein updating said profile of normal input is also based, at least in part, on the acceptable parameters.

9. The method of claim 1, further comprising:
the application firewall inspecting function output data from the serverless function to determine whether the function output data is acceptable; and
blocking communication of the function output data to a caller of the serverless function based on a determination that the function output data is not acceptable.

10. The method of claim 1 further comprising:
based on the serverless function being allowed to execute, inserting security sensors into the runtime environment to monitor execution behavior of the serverless function; and
raising a security action if unsafe or abnormal execution behavior is detected.

11. The method of claim 10 further comprising building a normal execution behavior profile based partly on monitored execution behavior of the serverless function if the serverless function executes with the input to completion without unsafe or abnormal behavior.

12. The method of claim 1 further comprising:
based on a determination that the input includes safe and unsafe data, allowing the serverless function to execute with the safe data and raising a security action for the unsafe data.

13. A non-transitory computer-readable medium having program code for an application firewall stored thereon, the application firewall program code comprising instructions to:
based on detection of an event that is a trigger for a serverless function, inspect input for the serverless function prior to execution of the serverless function to determine whether said input contains unsafe data, wherein the serverless function and the application firewall program code are in a same runtime environment and wherein the instructions to inspect the input to determine whether the input contains unsafe data comprise instructions to determine whether the input conforms to a profile of normal input built from samples collected from past events determined to have safe data;
based on a determination that the input does not contain unsafe data, allow the serverless function to execute with the input and collect sample data from the event; and
based on a determination that the input includes unsafe data that is malicious, raise a security action.

14. The non-transitory computer-readable medium of claim 13, wherein the program code further comprises at least one of:
instructions to determine whether the event conforms to a normal event profile, wherein the instructions to allow the serverless function to execute with the input also allow the serverless function to execute with the input based on a determination that the event conforms to the normal event profile;
instructions to determine whether the input includes data indicated in a white list, wherein the instructions to allow the serverless function to execute with the input also allow the serverless function to execute with the data indicated in the white list; and
instructions to determine whether the input includes data indicated in a black list, wherein the instructions to raise a security action also raise a security action if the input is determined to include data indicated in the black list.

15. The non-transitory computer-readable medium of claim 13, wherein the program code further comprises instructions to:
inspect output from the serverless function executing with the input to determine whether the output is acceptable; and
prevent communicating of the output to a caller of the serverless function if the output is determined to not be acceptable.

16. A system comprising:
a processor;
one or more machine-readable media having program code for a serverless function and program code for an application firewall stored thereon, the program code for the application firewall executable by the processor to cause the system to,
based on detection of an event that is a trigger for the serverless function, inspect input for the serverless function to determine whether the input contains unsafe data, wherein the application firewall and the serverless function are in a same runtime environment and wherein the program code to inspect the input to determine whether the input contains unsafe data comprises the program code executable by the processor to cause the system to determine whether the input conforms to a profile of normal input built from samples collected from past events determined to have safe data;
based on a determination that the input does not contain unsafe data, allow the serverless function to execute with the input and collect sample data from the event; and
based on a determination that the input includes unsafe data that is malicious or abnormal, raise a security action.

17. The system of claim 16, wherein the machine-readable media further has program code for execution behavior monitoring that is executable by the processor to cause the system to:
based on a determination by the application firewall that the input includes unsafe data that is suspicious, insert security sensors into the runtime environment and apply a more strict security policy for this execution of the serverless function to monitor execution behavior of the serverless function; and
raise a security action if unsafe or abnormal execution behavior is detected at least according to the applied security policy.

18. The system of claim 17, wherein the machine-readable media further has program code executable by the processor to cause the system to build a normal execution behavior profile based partly on monitored execution behavior of the serverless function if the serverless function executes with the input to completion without detection of unsafe or abnormal behavior.

19. The system of claim 16, wherein the program code for the application firewall is further executable by the processor to cause the system to:

based on a determination that the input includes safe and unsafe data, allow the serverless function to execute with the safe data and raise a security action for the unsafe data.

20. The system of claim 16, wherein the program code for the application firewall is executable by the processor to cause the system to at least one of:
   determine whether the event conforms to a normal event profile, wherein the program code for the application firewall to allow the serverless function to execute with the input is also executable to allow the serverless function to execute with the input based on a determination that the event conforms to the normal event profile;
   determine whether the input includes data indicated in a white list, wherein the program code for the application firewall to allow the serverless function to execute with the input is also executable to allow the serverless function to execute with the data indicated in the white list; and
   determine whether the input includes data indicated in a black list, wherein the program code for the application firewall to raise a security action is also executable to raise a security action if the input is determined to include data indicated in the black list.

21. The system of claim 16, wherein the program code for the application firewall is further executable by the processor to cause the system to:
   inspect output from the serverless function executing with the input to determine whether the output is acceptable; and
   prevent communicating of the output to a caller of the serverless function if the output is determined to not be acceptable.

22. The system of claim 21, wherein the program code for the application firewall being executable to inspect output from the serverless function executing with the input to determine whether the output is acceptable comprises the program code being executable to inspect the output to determine whether the output is sensitive information.

* * * * *